Patented Feb. 16, 1932

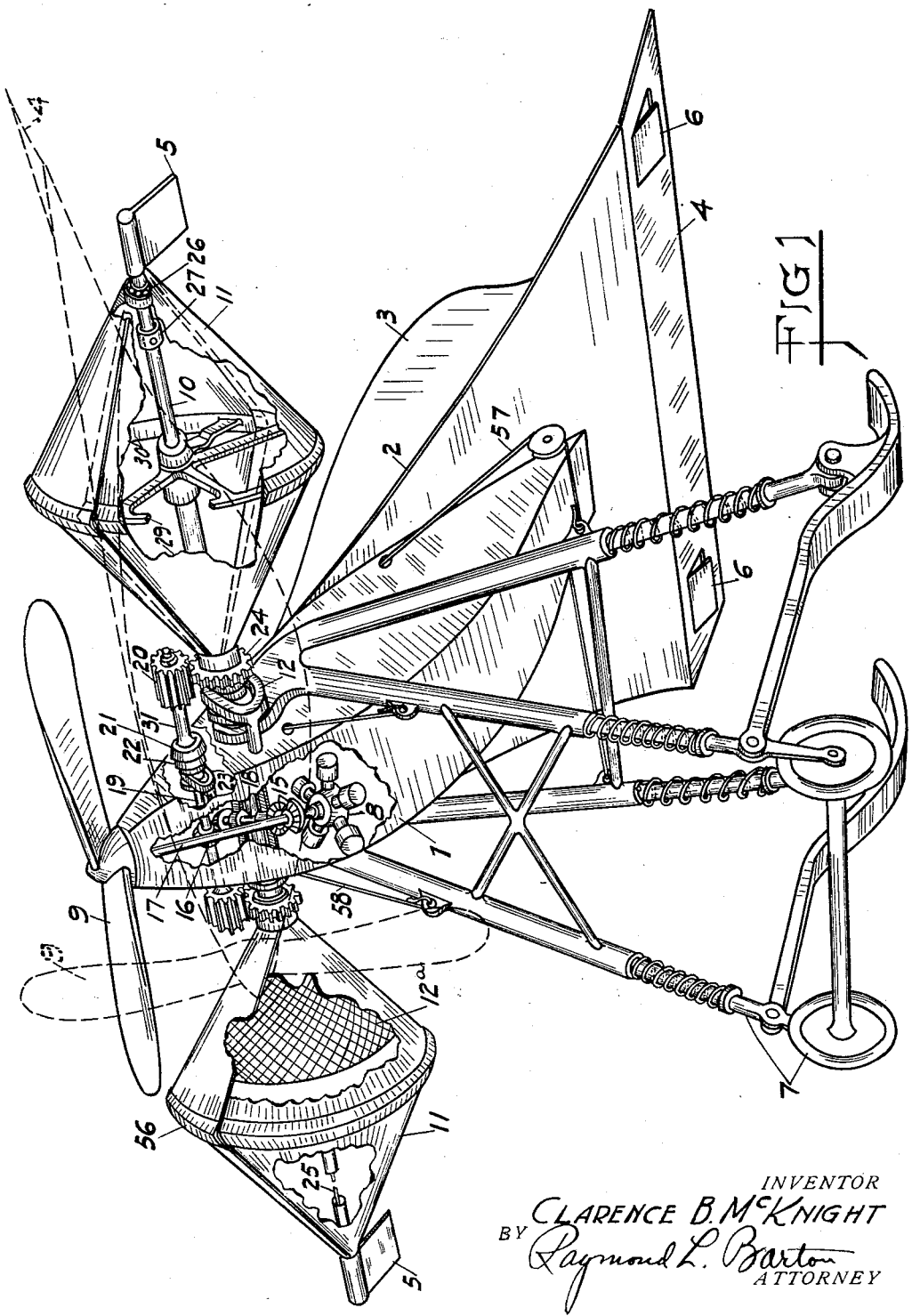

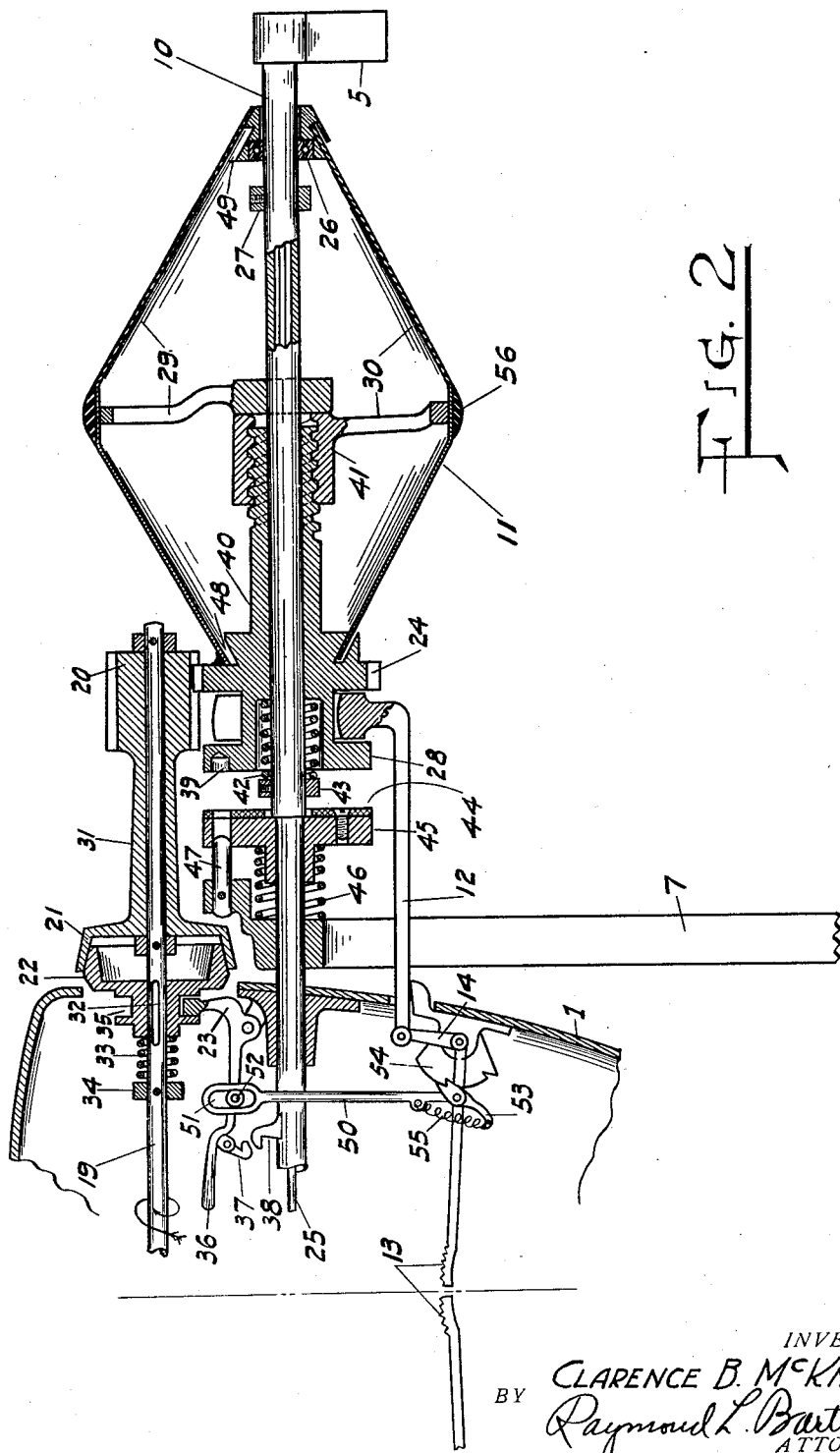

1,845,616

UNITED STATES PATENT OFFICE

CLARENCE B. McKNIGHT, OF LOS ANGELES, CALIFORNIA

AEROPLANE

Application filed February 25, 1930. Serial No. 431,111.

This invention relates to aircraft and more especially to improvements in aeroplanes, which will assist in the extension of aeronautical science, and advance the development of commercial aircraft, particularly in its use as a fundamental means of transportation of both goods and passengers.

Now that air transportation is regularly available and its popularity is definitely assured, to eradicate the one hitherto drawback of universal flying, namely; lack of an aerodynamically safe aeroplane, as well as producing an equally fool proof craft as any humanly controlled moving device can be made, is the ultimate aim and achievement of the present invention.

Basically, the invention proposes a novel and unique construction, which will insure an aerodynamically safe aeroplane, one capable of acute air maneuvering, ability to take off easier and land comfortably in case of abnormal conditions tending to produce loss of control.

Incorporated in the basic features of construction are: a pivotal fuselage, buoyant wings simultaneously and selectively adapted for both rotation and lateral displacement on their longitudinal axis, and a wing construction which may be converted into a parachute effect by circumferentially telescoping one half within the other.

These inherent features will be discussed at length in the disclosure following, taken in conjunction with the accompanying drawings and later pointed out in the appended claims.

In the drawings:

Figure 1 is a perspective view of my improved aeroplane, parts of the view being broken away to show interior construction and, Figure 2 is a fragmentary longitudinal mid-section taken through one of the wings and a part of the fuselage.

In fulfilling the aim of my invention, I propose features in the principle of construction wherein I employ the use of a pivotal fuselage simulating while at rest the poise of a bird.

Laterally athwart the craft and in a transverse plane with relation to the longitudinal axis thereof and substantially bisecting its center of gravity, I mount and extend therethrough and project an appreciable distance beyond each side thereof, a stationary core member or axis of support upon which I rotatively and slidably mount a pair of ancipital cone shaped drums of like configuration, contiguously arranged and adapted for simultaneous and selective rotation and lengthwise displacement. Said wings when disposed nearest the fuselage being further adapted to be automatically converted into a parachute effect which will enable the aeroplane to gradually descend under the influence of gravity.

Within said wings it is proposed to provide a sufficient amount of gas to aid in buoyantly supporting the structure, said gas being confined in bags which are capable of being deflated quickly when it is necessary to convert the wings into a gravity retarding member.

Through the particular arrangement for securing adjustability of the wings and the fuselage, it is possible to take-off and land in a more vertical fashion, thus approaching the feature of the helicopter, and this adjustment further permits of easier air maneuvering in the air streams and quicker regaining of equilibrium due to abnormal conditions, and in case of engine fire would permit of safe descent of passengers due to the backward projection of the flames while falling.

The fulfillment of the objects of my invention is attained in the manner illustrated in the accompanying drawings, the embodiment of which, selected for illustrative purposes, comprises a pivotal fuselage 1, a horizontal stabilizer 2, rudder 3, an elevator 4, ailerons 5 and 6, and a landing gear 7.

In Figure 1, the fuselage of the aeroplane is shown in two positions, one in full lines indicating a state of rest and one in dotted lines indicating a flying position.

From the angle indicated in the former position it will be observed that the aeroplane may take off almost vertically. The aeroplane may be made to assume a similar position when landing. Being able to take off and land in such a position will require much less area than is usually alloted to flying ships of this character. Within the fuselage is a motor 8 of any preferred design or make to which is connected the propeller 9, a portion of the fuselage being broken away to show this structure.

The parts hereinbefore enumerated are standard parts of construction and are well known in the art and descriptive matter pertinent to their function will not be dwelt upon now and only as is more particularly related to their correlated parts which will be described in detail.

Running athwart the fuselage and an appreciable distance therebeyond each side thereof, is a core member 10 which provides a pivotal axis for the fuselage to rotate upon as well as a support for the wings 11 to rotate and slide upon.

The wings 11 consist of a drum made from two cone shaped members adapted to house bags 12a containing a buoyant gas which will aid in supporting the weight of the plane, said bags being easily deflatable when it is desired to convert the wings into a parachute. The wings 11 are movable lengthwise the core member 10 by manually operating a fork lever 12 through the agency of the foot pedals 13 to which the fork 12 is operatively connected thru the medium of the link 14.

The wings are individually and selectively driven by the motor 8, by means of a train of gearing which is also manually clutch operated. Said train of gearing consist of two sets of bevel gears 15 and 16 operatively connected to the main driving shaft 17 by means of a counter shaft 18.

The bevel gears 16 in turn drive a second counter-shaft 19 to which is mounted a driving gear 20; a female cone clutch 21 and a male cone clutch 22, being manually operated by a fork 23 similar in action to that of fork 12 to effect simultaneous and selective rotation of the wings 11. The wing structures are similar in design as well as the mechanism which operates each of them.

To the driving gear 20 is connected a driven gear 24 and the driving gear 20 is made long enough to accommodate a sufficient longitudinal adjustment of the wing 11 upon the core member 10.

At the extremities of the core members 10 are mounted the ailerons 5 operated from the cock pit of the fuselage by means of the aileron connector 25. Said core is preferably made hollow to accommodate the insertion of operating and bracing parts such as the aileron connector 25 and the like, as well as making the structure stiffer and lighter.

The extreme points of the wings are rotatable in ball bearings 26 and a collar or shoulder 27 limits the movement of the wings toward the fuselage and after this position is reached the lower half of the wing is made to envelop within the upper half to form a parachute effect when a forced descent is necessitated, which description follows in detail.

The latter construction is shown in detail in Figure 2. The wings 11 are purposely made small in this view to accentuate the size of the remaining parts and consist of an upper half 29 and a lower half 30, said upper half being rigidly connected to the driven gear 24.

The rotation of the wings 11 is effected through the mating of the driven gear 24 with the driving gear 20, which in turn is clutch operated by manual control. The female clutch 21 is made integral with the driving gear 20 by a connecting hub 31 and loosely rotates upon the counter shaft 19.

The male clutch, however, is fixed to the counter shaft 19 by means of a key 32 and is yieldingly held in mesh with the female clutch by means of a clutch spring 33 and a clutch spring collar 34.

The fork 23 is manually operated to disengage the male and female clutch. Said fork having prongs which ride in a collar 35 integral with the male clutch.

When it is desired to selectively rotate a wing, the fork 23 is lowered sufficiently by manually depressing the fork handle 36 for the connecting pawls 37 and 38 to engage with each other.

When the pawls are thus engaged the aeroplane can fly with the wing stationary, or at such a period the wing can be reciprocated by the foot pedal 13 for maneuvering purposes.

For the purpose of bringing the rotating wing to a quick stop and at the same time maintaining the upper half 29 in position for a parachute effect and gravity opposing member so that the lower half may be circumferentially telescoped within the upper half, I provide in integral relation with the driven gear 24, a collar 28, in which the jaws of the fork 12 travel, a socket 39, a shank 40 which is threaded and screwed into a hub nut 41 to which the spokes of the lower half are fastened and which is adapted to telescope the lower half into the upper half when the full limit of travel of the wing toward the fuselage is consumed.

When the wing is retracted toward the fuselage by operating the fork 12, a spring member 42 maintained in fixed relation by the collar 43 fastened to the core member 10 is placed in tension, so as to laterally extend the wing against the action of manual pressure on the foot pedal or when it is in the unlocked position.

In order to stop rotation of the wing, I provide further a friction disk 44 applied to a brake disk 45. Said brake disk 45 being yieldingly retained in fixed relation on the core member 10 by the spring 46 and locking pin 47.

Said locking pin 47 finally being seated in the aforesaid socket 39 at the inward limit of travel of the wing and in which position the further depressing of the foot pedal 13 forces the lower half to telescope within the upper half by forcing the hub nut 41 on to the threaded portion of the shank 40 thus causes it to envelop within the upper half, slots 48 and 49 being provided for the end extremities of the lower half to seat therewithin.

At a critical moment when descent is necessitated, the wings can be reciprocated to the inward limit of travel, stopped rotating and telescoped simultaneously by the foot pedal 13.

Such a means comprises in conjunction with the hereinbefore recited correlating parts, a connecting link 50 having an eyehole 51 into which projects a pin 52, fastened to the afore described fork 23. Said link in turn is pivotally connected to the foot pedal 13 and is further provided with a connecting pawl 53 yieldingly held in relation to a ratchet disk 54 by means of a spring 55. When the telescoping is effected through the mechanical manipulations hereinbefore enumerated the pawl engages the ratchet thus maintaining all co-acting members in fixed relation during descent of aeroplane.

The displacement of the wing structures longitudinally both individually and selectively aid in quick turning and banking when acute maneuvering is necessary, also the opening and closing producing parachute effect may be done to an advantage selectively in stunting and exhibition flying.

At a point where the girth of the wings is greatest are provided tire ridges 56. These tire ridges may be made use of when moving the aeroplane about on the ground or are a convenience for handling freight and passengers when the landing gear has been retracted along side of the fuselage by means of the rearward adjustment cable 57. A forward adjustment cable 58 is likewise provided for manipulating the landing gear when preparing for alighting.

When approaching a landing the pilot directs the nose of the plane upwardly allowing the plane to gravitate downwardly under the action of gravity, the descent being retarded by the propeller and the buoyant gas until contact of the landing gear with the ground, at which time the shock absorbers on the landing gear will absorb the shock of impact after which any slight forward movement of the plane will be taken care of by the wheels and skids thereof.

Such a means of landing imitates the alighting of certain species of birds and by which the structure and shape of certain types of aeroplanes have heretofore been patterned and makes possible the use of more limited space for take-off and landing, a problem not to be overlooked in big cities and mountainous terrain.

In operation: Owing to the fact that the propeller shaft 17 is placed at a sufficient distance below the transverse axis of the core member 10 supporting the wings 11 to cause the current of air to be directed against the under and inner side of each drum-shaped wing; and also because of the fact that the elevator 4 at the stern of the craft is directed upwardly at starting, the front end of the craft is farther elevated and the rear end thereof at the same time farther depressed, the craft as a whole is given a steep inclination, say an angle of 60 degrees at the moment of taking off. At the same time the lifting effect is augmented by the rapid rotation of the drum shaped wings.

After the take-off of the plane the fuselage is made to assume a navigable position by operating the four ailerons 5 and 6, and other standard controls well known in the art.

When it is desired to turn on a small radius for maneuvering purposes or overcoming air drift and the like, the wings are longitudinally displaced, one wing being brought closer to the fuselage, the other being displaced farther therefrom, all depending on which direction it is desired to turn the craft; the one retained closest to the fuselage is employed to utilize the air displaced by the propeller to act on its inner cone shaped surface to urge the craft about a shorter radius, the other wing being displaced farther therefrom to avoid any action of current of air on its peripheral cone shaped surface.

While navigating in the air the landing gear is retracted to a recumbent position alongside of the fuselage to lessen its resistance against the air.

When it is desired to effect a landing the pilot directs the nose of the plane upwardly at an angle of from 60 to 90 degrees, throttles the motor to a speed which will allow the craft to gradually settle in a position similar to that of taking off, the landing gear being manipulated at a corresponding angle which will effect a proper landing of the craft and at the same time withstand the shock of the impact.

In case of motor trouble and a forced landing becoming necessary the drum shaped wings will be retracted to their limit of travel toward the fuselage thereby automatically causing the lower half of the wing to circumferentially telescope within its upper half, forming a parachute effect.

In the meantime while this operation is being performed the gas bags will have been deflated thus preparing the wings to perform their parachutic function.

Claims:

1. An aeroplane having a core member, a fuselage adapted for pivotal movement about said core member, and a rotatable and telescopic wing structure mounted upon said core member.

2. In combination, with the fuselage of an aeroplane, of a pair of rotatable telescopic wings adapted to contain a buoyant gas and means to rotate said wings.

3. The combination with a fuselage, of a core member upon which said fuselage is pivotally mounted, and a wing member adapted to be telescopically converted into a parachute to sustain said fuselage.

4. The combination with the fuselage of an aeroplane of a pair of rotatable drums to act as wings therefor, a retractable landing gear tire ridges for said drums, upon which the aeroplane may land, while the landing gear is in recumbent position and manually operative means for retracting said landing gear.

5. In an aeroplane construction, a fuselage and supporting wings therefor, said wings being adapted for adjustment to and from said fuselage, and means to envelop one half of each of said wings within the other half thereof.

6. In an aeroplane construction, a fuselage simulating the breast of a bird, a core member running athwart thereof, means to manipulate said fuselage pivotally thereabout, wings mounted upon said core member, and means to individually and selectively rotate said wings.

7. In an aeroplane construction, the combination with a fuselage, of a pair of rotatable telescopic wings and means to rotate said wings.

8. An aeroplane, a core member, a fuselage adapted for pivotal movement thereabout, a wing therefor, the girth of said wing being greatest at its mid length, and means to effect a longitudinal displacement of said wing.

9. An aeroplane, a fuselage, and a wing therefor, means to rotate said wing, said wing being composed of two sections which are circumferentially telescopic with relation to each other, and means to effect lateral adjustment of said wing and its telescopic action.

10. In combination with the fuselage of an aeroplane, a drum mounted upon each side of said fuselage and adapted to act as a wing therefor, each of said drums being the shape of a pair of cones having juxtaposed bases and being telescopic.

11. An aeroplane provided with a drum-shaped wing rotatable about an axis which extends transversely of the craft and adapted for rotation to aid in lifting the craft, means to rotate said wing, said wing being adapted to when in one of its circumferential positions to be converted into a parachute, and means to lock said wing in said last recited position.

12. An aeroplane having a fuselage, a core member extending transversely of said fuselage and projecting outwardly beyond each side thereof, and wings consisting of hollow bodies mounted upon said projecting portions of said core member, said wings each comprising parts which are circumferentially adjustable about said core member and with relation to each other to convert them from wings proper into members which are adapted to act as parachutes to oppose rapid descent of the craft.

13. In an aeroplane, the combination with a landing gear and a fuselage, of a core member serving as an axis about which said fuselage and said landing gear are manually manipulating to adapt said aeroplane for a steeply inclined take off.

14. In air craft, an elongated core member, a fuselage pivotally mounted thereroundabout, said core member extending transversely thru said fuselage, and a telescopic wing structure mounted on said core to rotate axially thereabout.

CLARENCE B. McKNIGHT.